J. O. MACK.
TUNNELING APPARATUS.
APPLICATION FILED MAR. 11, 1918.
1,317,586.
Patented Sept. 30, 1919.
6 SHEETS—SHEET 4.
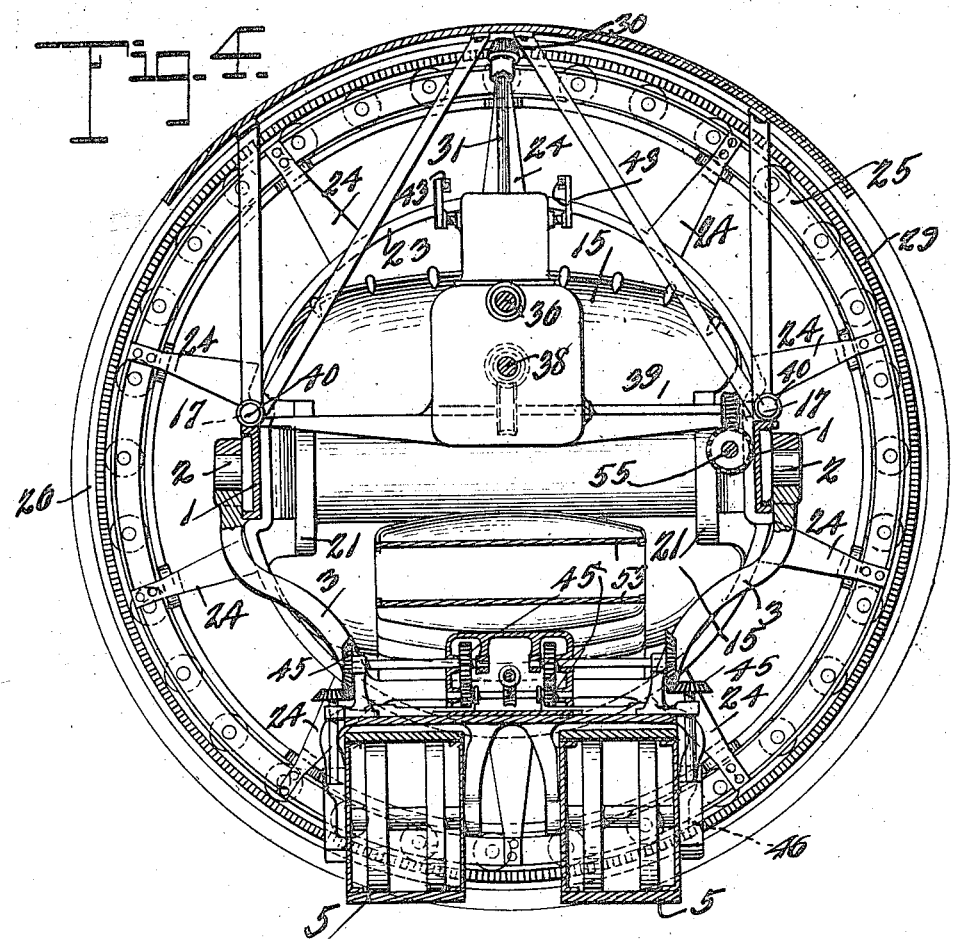
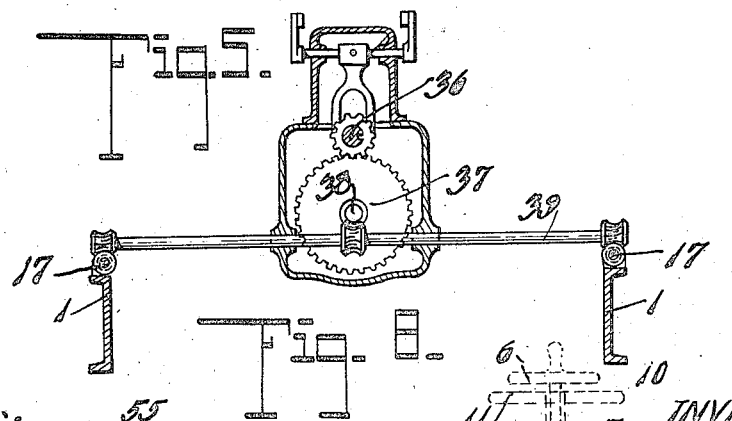
WITNESS:
C. H. Wagner.
INVENTOR
J. O. Mack
BY
ATTORNEYS

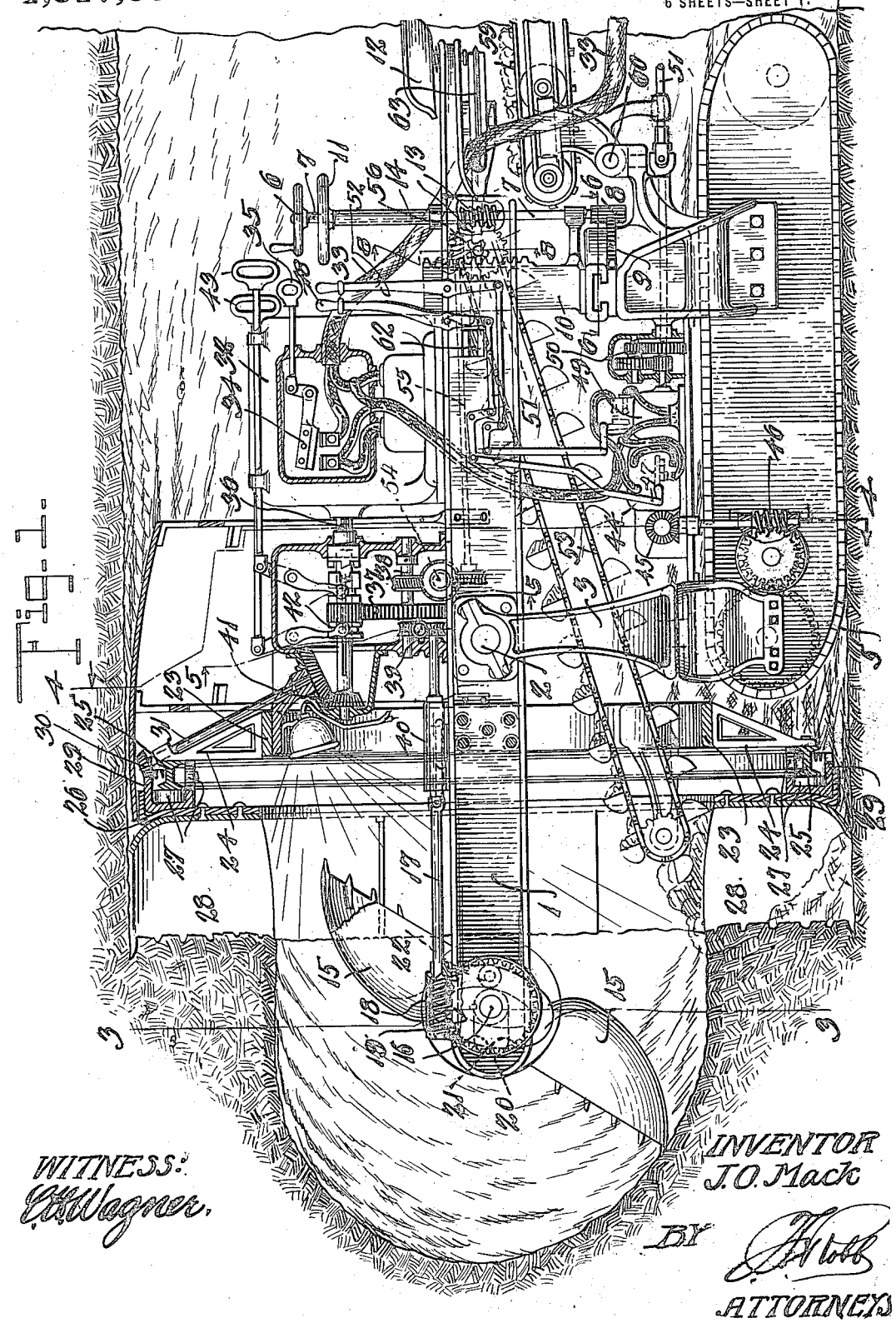

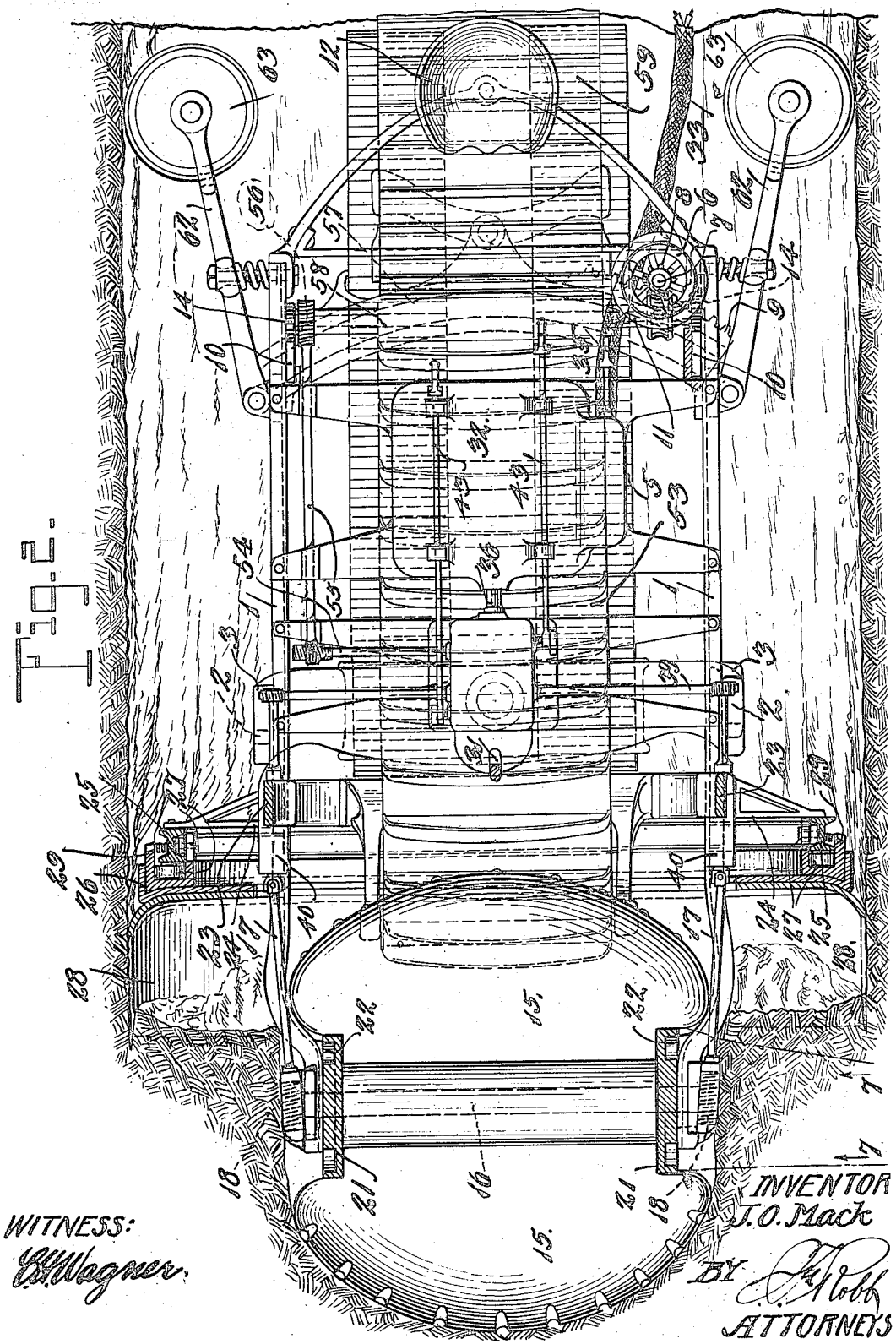

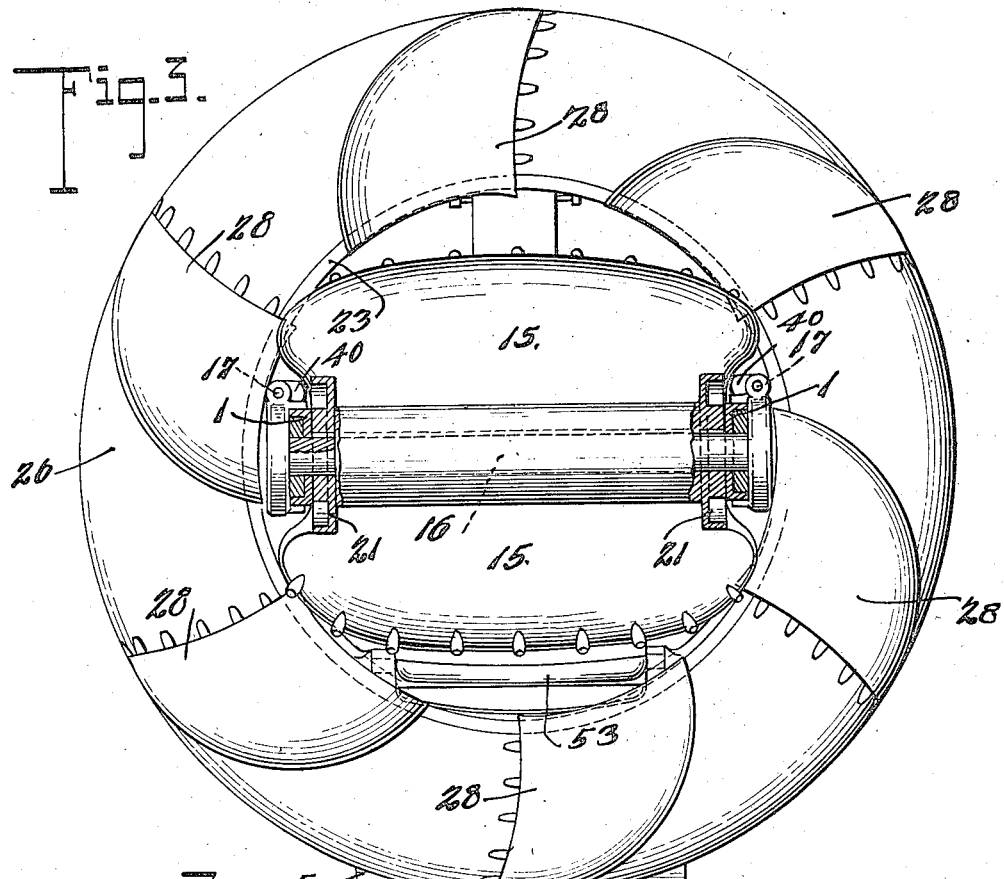
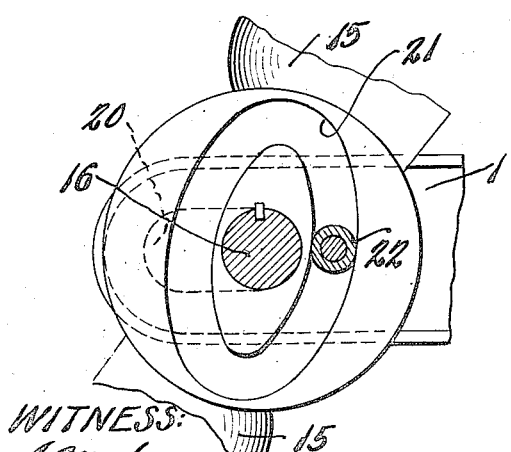
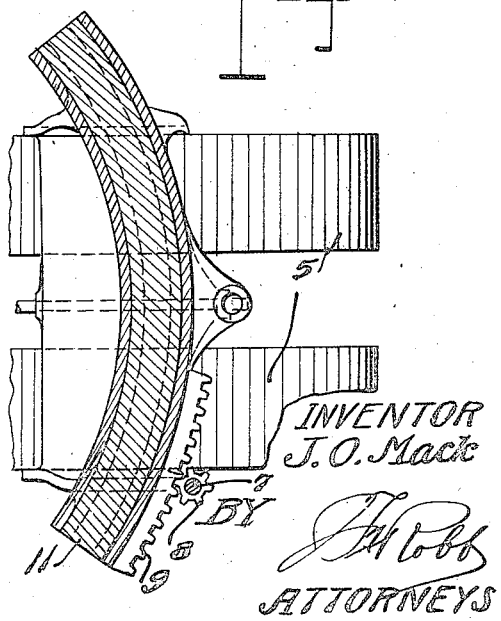

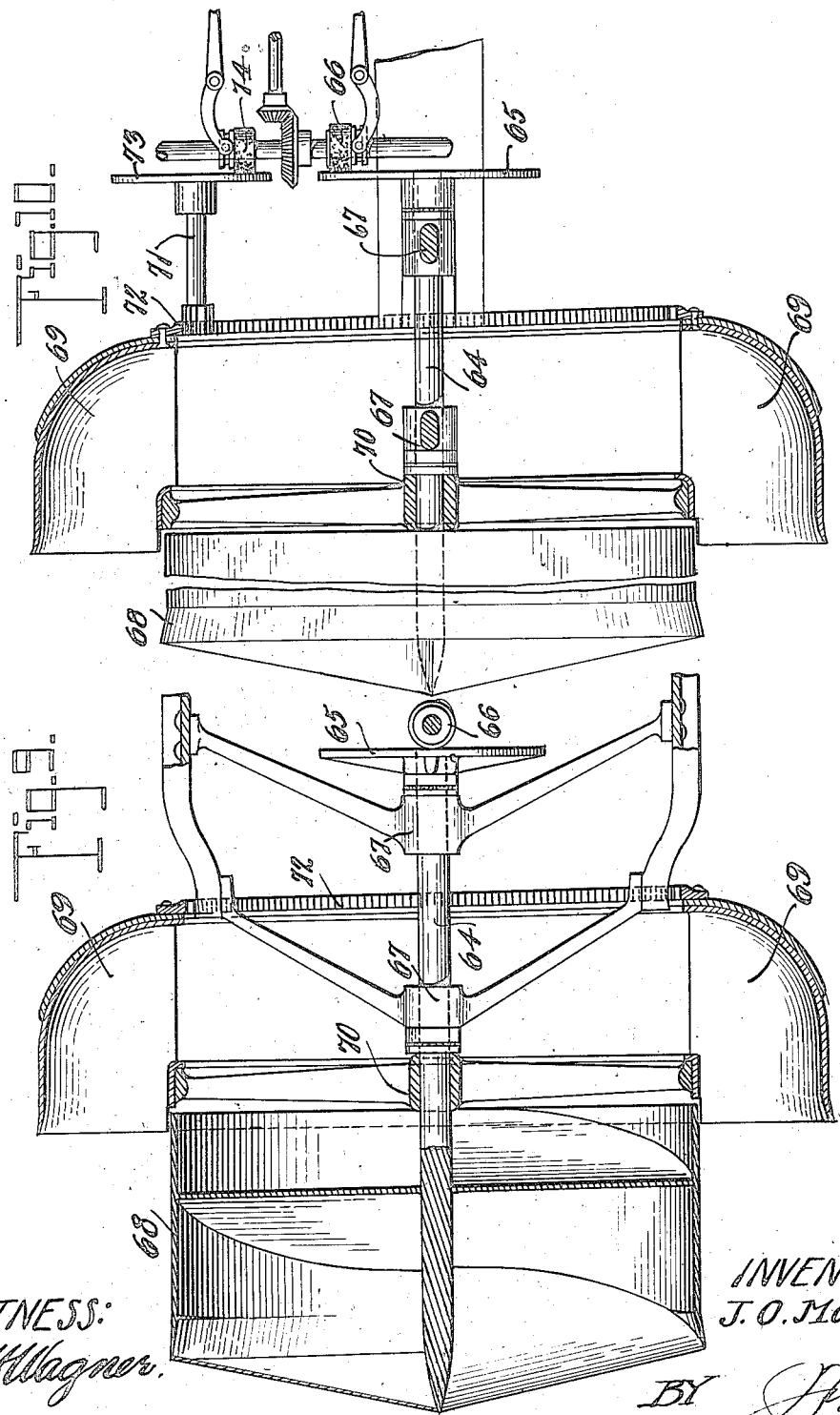

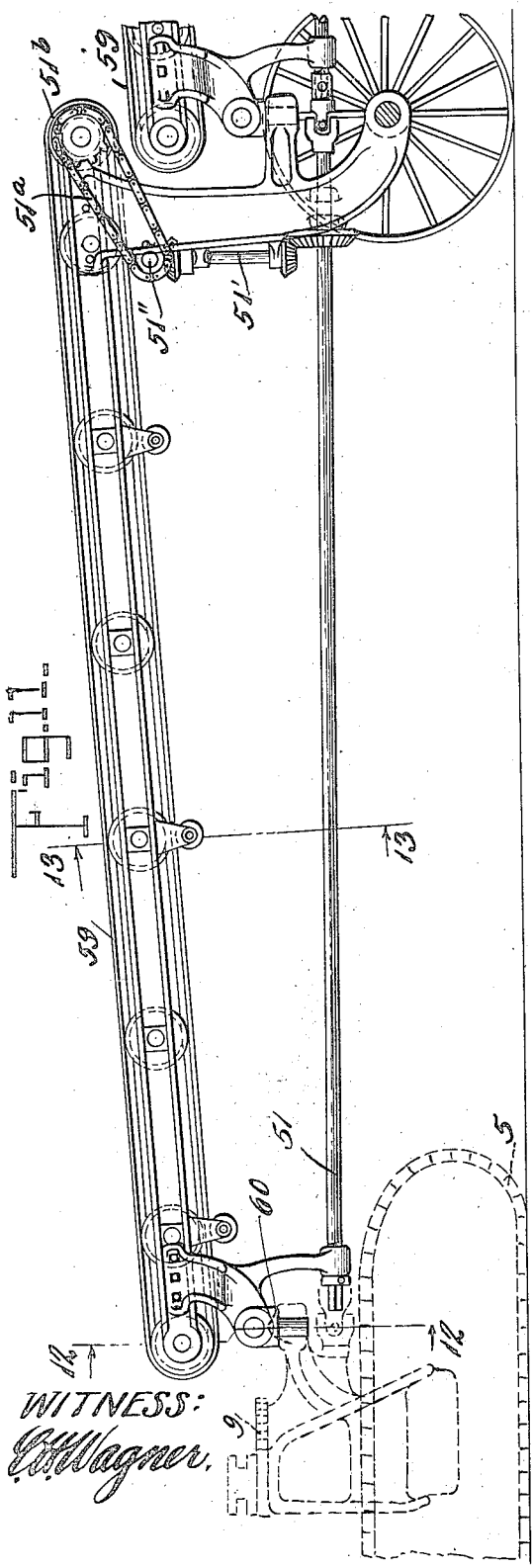

UNITED STATES PATENT OFFICE.

JAMES O. MACK, OF ALEXANDRIA, LOUISIANA.

TUNNELING APPARATUS.

1,317,586. Specification of Letters Patent. Patented Sept. 30, 1919.

Application filed March 11, 1918. Serial No. 221,703.

*To all whom it may concern:*

Be it known that I, JAMES O. MACK, a citizen of the United States, residing at Alexandria, in the parish of Rapides and State of Louisiana, have invented certain new and useful Improvements in Tunneling Apparatus, of which the following is a specification.

The present invention has to do with the art of excavating machinery of that type particularly designed for tunneling.

For the purpose of obtaining a general understanding of the objects and advantages of the device involved, it may be noted that the apparatus is especially adapted for use in connection with warfare where it is desired, for example, to approach enemy trenches, fortifications, or battle lines generally, with a view to planting mines, making surprise attacks, or carrying out similar operations which are best accomplished by underground advances since these are less likely to be discovered or anticipated by the enemy. Of course it is to be understood that the foregoing does not in any way prescribe the limits of utility of the invention for it is equally well adapted for mining purposes generally, or pipe line excavations and similar work, so that I do not in any sense desire to be unnecessarily restricted as regards the scope of the inventive idea.

To the foregoing end my apparatus embodies, generally, excavating instrumentalities mounted upon a suitable vehicular supporting means capable of being advanced as the excavation proceeds, and means for conveying the excavated material from the tunneled passage by a continuous process hereinafter more specifically referred to.

An essential feature of the apparatus lies in the particular excavating instrumentalities whereby the excavation operation is greatly facilitated by providing certain of such elements for producing a relatively small bore immediately followed by cutting devices considerably enlarging the bore so that a minimum amount of power is required for doing the work.

Another important feature is presented in the arrangement of the excavating instrumentalities and coacting devices such that tendency to overturn the apparatus owing to the torque produced by the rotation of said instrumentalities is effectively overcome.

A further subsidiary feature lies in the provision for directional changes so that where desired or required the cutting instrumentalities may be shifted in vertical or horizontal planes to form the tunnel in the particular line of attack, at the will of the operator.

These and such other objects as may hereinafter appear are attained by the novel construction, combination and arrangement of parts to be hereinafter specifically described and claimed. Reference will now be had to the accompanying drawings forming a part of this specification, wherein:

Figure 1 is a view in elevation of an apparatus constructed in accordance with the invention, certain of the excavating instrumentalities being broken away and shown in section;

Fig. 2 is a top plan view with certain of the excavating instrumentalities similarly broken away and shown in section;

Fig. 3 is a vertical sectional view taken substantially on the plane indicated by the line 3—3 of Fig. 1;

Fig. 4 is a similar sectional view taken upon the plane indicated by the line 4—4 of Fig. 1 and looking in the direction of the arrows;

Fig. 5 is a fragmentary sectional view on the line 5—5 of Fig. 1;

Fig. 6 is an enlarged fragmentary sectional view on the line 6—6 of Fig. 1;

Fig. 7 is a similar sectional view on the line 7—7 of Fig. 2;

Fig. 8 is a vertical sectional view on the line 8—8 of Fig. 1, looking in the direction of the arrows;

Figs. 9 and 10 are horizontal and vertical sections, respectively, through a modified type of excavating instrumentalities;

Fig. 11 is a side elevation of a trailer unit showing its operating connections more clearly; and Figs. 12 and 13 are sectional views taken on the respective lines 12—12 and 13—13 of Fig. 11;

Fig. 14 is a sectional view through the rear end of the conveyer unit shown in Fig. 11.

General structural features.

In general structure the device consists of an elongated frame 1 which is pivotally mounted upon the axis 2 journaled at the upper end of the supporting standard 3, the latter in turn being pivotally carried by the forward portion or frame of the traction support which in this instance is of the caterpillar type as indicated at 5. The frame 1 referred to carries the excavating instrumentalities hereinafter described and is capable of adjustment in a horizontal plane about the pivot of the supporting standard 3 by means of the hand wheel 6 secured to the shaft 7 which at its lower end is provided with a pinion 8 meshing in an arcuate shaped rack 9 supported by the framework of the traction support at the rear of the apparatus. This frame has mounted thereupon a standard 10 having T head and slot connection with the traction frame as best shown in Fig. 1 so that as the operator rotates the hand wheel 6 the frame 1 will be shifted horizontally to change the direction of excavation by its cutting instrumentalities. A second hand wheel 11 adjacent to the hand wheel 6 and disposed at a covenient position with respect to the operator's seat 12 operates a worm 13 which has rack and pinion connection with the rear end of the frame 1 as indicated generally at 14, so that upon rotation of the hand wheel 11 the frame will be caused to rock upon its pivot 2 for adjustment in a vertical plane.

It follows from the foregoing description that the apparatus may be directed from the surface of the ground downwardly until it reaches the level for tunneling that may be desired and during the tunneling operation whenever it is required the operator shifts the apparatus for changing its direction of travel laterally, with respect to the tunnel bore.

Excavating means.

The excavating means or instrumentalities comprehended by my invention consist of the primary or advance excavator mounted at the forward extremity of the frame 1 and consisting of the opposing shovels or cutters 15. This excavator is of a rotary type and revolves in a vertical plane upon an axis 16 transversely disposed with respect to said frame. It is driven by means of operating shafts 17 which are provided at their forward extremities with worms 18 meshing with gears 19 and in addition to the rotation of the excavator it is given a bodily shifting movement for reasons which will appear as this description proceeds. In order to provide for this last mentioned bodily movement the forward end of the frame is slotted as indicated at 20 (see Fig. 7) so that the axle 16 of the excavator is capable of movement to and fro in said slot as controlled by the elliptical cams 21 and co-operating rollers 22 on the frame and projecting into the cam grooves. By reference to Fig. 1 the special arc of cut prescribed by this rotary excavator will be observed. In other words, as one of the cutters 15 approaches a certain point in the arc of rotation it is shifted longitudinally of the frame 1 so as to cut into the earth in advance of the apparatus, the opposing cutter being likewise shifted so as to make effective discharge of the material which has been previously cut thereby upon a conveyer disposed in rear of the excavator, such movement, furthermore, permitting the discharging cutter or bucket to escape the conveyer which is arranged at such a position that it would be in the path of rotation of these cutters were it not for such movement.

The excavator just referred to, as will be noted in Fig. 1, cuts an excavation of relatively small diameter and the bore of this excavation is considerably enlarged by a secondary or annular cutter now to be described. At the forward portion of the frame 1 is arranged an annulus 23 having the supporting spider 24 on which is mounted the annular track 25. The cutter frame 26 is mounted for rotation upon the track way, being provided with suitable anti-friction rollers 27 to facilitate the operation. The frame has projecting forwardly therefrom the cutters 28 best seen in Fig. 3, each of said cutters having a double cutting edge so as to cut the forward wall about the bore excavated by the primary cutter and the annular wall so as to make a finished surface, all as will be readily comprehended by those skilled in the art to which this invention appertains.

The cutter frame is formed with a rack 29 at its rear edge with which the pinion 30 upon the operating shaft 31 meshes. The said shaft is suitably power driven, as will be described, from the source of power carried by the excavating apparatus.

Motive power devices.

Mounted upon the frame at a suitable point is the main cutter driving motor 32 which is operated from a suitable source of electric power supplied from the exterior of the tunneled excavation through the electric conductor or cable 33. A switch 34 with its operating handle 35, conveniently located with respect to the operator, is designed to be closed for driving the main cutter motor just referred to, said motor being provided with a drive shaft 36. Motion for the primary excavator is obtained from this shaft through the drive gear 37 upon the counter shaft 38, from thence through the transverse worm shaft 39 and its worm and gear connections to the driving shafts 17 hereinbefore described. A slip connection or joint 40 is provided in this driving connection so as to permit the back and forth movement of the primary cutter in the manner described with reference to the operation of this instrumentality.

Actuation of the annular or secondary cutter is obtained from the drive shaft through the bevel gear connection indicated at 41 to the shaft 31 arranged at an incline as will be observed in Fig. 1. Suitable clutch devices indicated generally at 42 are provided and controlled by means of the rods 43 so that the cutting instrumentalities may be actuated or their operation discontinued at the will of the operator of the machine.

Obviously the apparatus must be advanced as the cutting or excavation proceeds and I preferably employ an independent motor of sufficient capacity as indicated at 44 which through suitable gear arrangements generally indicated at 45 operates the drive gear 46 for the caterpillar traction elements. The source of electricity is supplied to the motor 44 by the closing of the switch 47 through the actuation of the operating lever 48.

A still further motor drive is obtained by the motor 49 for driving the rear or trailing conveyer devices through the transmission gears 50 and the flexible drive shaft 51. The motor switch of the last named motor is operated by means of the lever 52.

Conveyer mechanism.

Mounted upon the main frame 1 so as to incline slightly downwardly is the main conveyer 53 which for the purposes of this description will be termed the transferring conveyer. Motion is obtained from the main drive shaft for this conveyer through the counter shaft 38 geared to the transverse shaft 54 which actuates the longitudinally arranged conveyer shaft 55 (see Figs. 2 and 8). This shaft is a sleeve shaft and is provided with a worm 56 and a conveyer drum 57 about which the conveyer 53 passes. The conveyer shaft referred to is carried by the axle 58 which is subject to vertical movement through the racks and pinions under the control of the worm 13 upon the elevating shaft 7. The material from both the primary and secondary excavating instrumentalities is dumped by the cutters upon the conveyer 53 which conveys said material to the rear portion of the machine and transfers it to the trailing conveyer having pivotal connection at 60 with the rear of the caterpillar frame and comprising separate units each an endless conveyer. Each trailing conveyer unit is mounted upon suitable wheeled supports as seen in Fig. 11 and obtains its drive from the flexible shaft 51 through a vertical shaft 51', transverse shaft 51'', chain connection 51ª and conveyer drum 51ᵇ. These units are added as the apparatus proceeds into the tunnel and as a whole the conveyer is obviously flexible to follow tortuous paths, each unit thereof being independent of the others as regards its conveying function. Thus as the material is dumped upon the forward conveyer 59 from the transferring conveyer 53 it is carried through the continuous line of trailing conveyers to the entrance of the tunnel and the conveying is thus continuous.

Torque counteracting arrangements.

Any tendency to overturn the apparatus hereinbefore described which is produced by the rotation of the cutting instrumentalities is effectively counteracted by the wall engaging members shown most clearly in Fig. 2 of the preferred construction as consisting of the arms 62 each pivotally connected to the frame at one end and carrying the contact disk 63 at its other end. These arms are spring pressed so as to be yieldable and to maintain contact of the members 63 with the walls of the tunnel bore.

At this point it is desirable to refer to a modification of the cutting instrumentalities which is extremely advantageous not only in performing the excavating operation but for counteracting this torque tendency just referred to by reason of the particular type of cutters themselves. In Figs. 9 and 10, 64 designates a drive shaft which receives its actuation through friction disks 65, 66 operated by the main drive motor, this friction drive being desirable owing to the facility with which the speed of actuation may be varied. The shaft is journaled in suitable spaced bearings 67 and carries at its forward extremity a rotary cutter 68 which, as will be seen, is the relatively smaller of the two cutting devices. In other words, the cutter 68 removes the core of the excavated material, while the larger annular cutter 69 removes the surrounding earth to be excavated to the extent of the diameter of the tunnel bore. This cutter 69 is suitably journaled upon the shaft 64 at 70 and is driven by the drive shaft 71 operatively connected by the rack and pinion 72 to the cutter and actuated similarly to the cutter 68 by the friction disks 73, 74. By reason of the arrangement of the friction disk drive the two cutting instrumentalities just described are driven in opposite directions so that the torque produced by one of said cutters is counteracted by the torque produced by the other. It is to be understood that this counteracting effect is best carried out by making the cutters of such size as to remove equivalent quantities of the earth but the object may be otherwise accomplished by varying the speed of the cutters. If any tendency to overturn the machine arises the speed of the proper cutter may be accelerated or decreased as required to take care of the condition.

Summary.

It will be apparent from the foregoing description that the apparatus when moved to the position for the commencement of the tunnel operation is directed downwardly by a proper shifting of the frame so that the cutting instrumentalities will start to bore into the surface and when the proper level beneath said surface is reached the frame is shifted so that the cutting will be effective in a horizontal plane. The bore may take a tortuous path by shifting of the frame laterally in the manner hereinbefore described, and when the objective has been arrived at the boring of the tunnel is discontinued and the apparatus withdrawn from the tunnel by its own or other exterior propelling instrumentalities. Throughout the excavating advance the trailing conveyer takes care of the removal of the earth to the entrance of the tunnel, a sufficient number of conveyer units being added as the length of the tunnel requires. To best prevent the driving mechanism gearing and other devices from the falling earth I preferably provide a suitable shield 61 upon the apparatus and I desire it to be understood that other details of construction and arrangement of the parts may be added and arranged without departing from the spirit of the invention and within the scope of the claims hereto appended.

Having thus described my invention, what I claim as new is:

1. In tunnel excavating apparatus of the class described, the combination with a support and means for moving the same as the excavation proceeds, of advance excavating means mounted on said support for producing a bore of relatively small size, and separate excavating means simultaneously operable to enlarge the bore cut by the first mentioned excavating means.

2. In tunnel excavating apparatus of the class described, the combination with a support and means for moving the same as the excavation proceeds, of a cutter for excavating in advance of the support, and a secondary cutting means arranged slightly in rear of said cutter for operating upon the walls of the excavation produced by the first mentioned cutter to thereby enlarge the excavation made by the latter.

3. In tunnel excavating apparatus of the class described, the combination with a support and means for moving the same as the excavation proceeds, of a cutter mounted on the forward end of the support and operable about an axis transverse to the longitudinal axis of the excavation, and other cutting means coacting with the first mentioned cutter and operable about an axis longitudinal with respect to the excavation bore.

4. In tunnel excavation apparatus of the class described, the combination with a support and means for moving the same as the excavation proceeds, of a rotary excavator mounted at the forward end of the support and having its cutting elements arranged to operate about an axis transverse to the direction of travel of the support and to displace the excavated material rearwardly thereof, and other cutting means operable about an axis longitudinal of the excavation for cutting upon the walls of the excavation left by the first mentioned cutter to thereby enlarge the excavation.

5. In tunnel excavation apparatus of the class described, the combination with a support and means for moving the same as the excavation proceeds, of a rotary excavator mounted at the forward end of the support and having its cutting elements arranged to operate about an axis transverse to the direction of travel of the support and to displace the excavated material rearwardly thereof, other cutting means operable about an axis longitudinal of the excavation for cutting upon the walls of the excavation left by the first mentioned cutter to thereby enlarge the excavation, and conveying means common to both said excavators to receive and convey the material toward the rear of the support.

6. In tunnel excavation apparatus of the class described, the combination with a support and means for moving the same as the excavation proceeds, of a rotary cutter arranged at the forward end of the support for excavating a relatively small bore, an annular excavator mounted adjacent to and independent of the rotary cutter for enlarging the bore produced by the latter, and means for actuating said cutting instrumentalities.

7. In tunnel excavation apparatus of the class described, the combination with a support and means for moving the same as the excavation proceeds, of independent excavators mounted at the forward end of the support and operable in planes at right angles to each other, and means on said support for driving said excavators.

8. In tunnel excavation apparatus of the class described, the combination with a support and means for moving the same as the excavation proceeds, of independent excavators mounted at the forward end of the support, and means for shifting one of said excavators on said support relative to the other during its operation to produce an advance cutting action.

9. In tunnel excavation apparatus of the class described, the combination with a support and means for moving the same as the excavation proceeds, of independent excavators mounted at the forward end of the support, and means on said support for operating said excavators and for shifting one of the same on the support relative to the other during its operation to produce an advance cutting action.

10. In tunnel excavating apparatus of the class described, the combination with a support, of a rotary excavator mounted on the forward end of said support and comprising opposing cutting elements, means for rotating said excavator, and means for shifting the cutting elements forward during a portion of the arc of rotation of the excavator to produce a forward cutting action.

11. In tunnel excavating apparatus of the class described, the combination with a support, of a rotary excavator mounted on the forward end of said support and comprising opposing cutting elements, means for rotating said excavator, and means for shifting the cutting elements forward during a portion of the arc of rotation of the excavator to produce a forward cutting action and rearwardly during another portion of the arc of rotation to effect discharge of the material excavated.

12. In tunnel excavating apparatus of the class described, the combination with a support, of a rotary excavator mounted on the forward end of said support and comprising opposing cutting elements, means for rotating said excavator, means for shifting the cutting elements forward during a portion of the arc of rotation of the excavator to produce a forward cutting action and rearwardly during another portion of the arc of rotation to effect discharge of the material excavated, and a conveyer adjacent to said cutter arranged to receive the material during the rearward movement of the excavator.

13. In tunnel excavating apparatus of the class described, the combination with a support, of a rotary cutter mounted on the forward end of the support, an axis for said excavator movable back and forth on the support, a cam, means for rotating said excavator, and other means coacting with the cam for moving the excavator axis in the manner aforesaid during rotation of the excavator.

14. In tunnel excavating apparatus of the class described, the combination with a frame and propelling means on which said frame is suitably supported, of an excavator mounted on the forward portion of said frame, the frame being slotted, a support for said excavator mounted in the slotted extremity of the frame, a cam adjacent to said slotted extremity, a projection coacting with the cam for shifting the excavator back and forth in the slotted extremity, and driving means for said excavator for actuating the same to produce cutting action and shifting of the cutter incident thereto.

15. In a tunnel excavating machine of the class described, the combination of a frame and propelling means upon which said frame is mounted, excavating instrumentalities carried by said frame, and conveying means pivotally connected to the frame at one end for conveying the material excavated by the excavating instrumentalities from the tunnel, said conveying means comprising separate endless conveyers pivotally connected one behind the other so as to receive the material and transfer the same from one to the other.

16. In a tunnel excavating machine of the class described, the combination of a frame and propelling means upon which said frame is mounted, excavating instrumentalities carried by said frame, conveying means pivotally connected to the frame at one end for conveying the material excavated by the excavating instrumentalities from the tunnel, said conveying means comprising separate endless conveyers pivotally connected one behind the other so as to receive the material and transfer the same from one to the other, and driving means for actuating the excavators and operatively connected with the conveyers to effect actuation of their endless members.

17. In a tunnel excavating machine of the class described, the combination of a frame and propelling means on which said frame is mounted, excavating instrumentalities at one end of said frame, trailing conveyers connected to the other end of said frame to be drawn along with the latter, and a transferring conveyer carried by said frame so as to receive the material from the excavating instrumentalities and transfer the same to the trailing conveyers.

18. In a tunnel excavating machine of the class described, the combination of a frame and propelling means on which said frame is mounted, of excavating instrumentalities mounted at one end of said frame, and yieldable guide means mounted at the other end of said frame for coacting with the side walls of the tunnel excavated to guide said frame while permitting its movement through the tunnel, said guide means positively engaging the surface of the wall to prevent overturning due to torque.

19. In a tunnel excavating machine of the class described, the combination of a frame and propelling means on which said frame is mounted, of excavating instrumentalities mounted at one end of said frame, yieldable guide means mounted at the other end of said frame for coacting with the walls of the tunnel excavated to guide said frame in movement through the tunnel, said guide means comprising arms pivotally connected to the frame at opposite sides, pressure devices coacting with the arms intermediate their length for pressing said arms outwardly to effect coöperation with the walls of the tunnel, and contact members at the free ends of said arms engaging with the walls whereby to prevent rotation of the excavating machine as a result of the torque produced by the operation of the excavating instrumentalities.

In testimony whereof I affix my signature.

JAMES O. MACK.